United States Patent
Yano (10) Patent No.: US 9,609,202 B2
(45) Date of Patent: Mar. 28, 2017

(54) IMAGE PICKUP APPARATUS AND CONTROL METHOD WITH FOCUS ADJUSTING MODES

(71) Applicant: CANON KABUSHIKI KAISHA, Tokyo (JP)

(72) Inventor: Shinichiro Yano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/742,899

(22) Filed: Jun. 18, 2015

(65) Prior Publication Data

US 2015/0373253 A1 Dec. 24, 2015

(30) Foreign Application Priority Data

Jun. 20, 2014 (JP) ................. 2014-126983

(51) Int. Cl.
*H04N 5/232* (2006.01)
*G02B 7/28* (2006.01)
(Continued)

(52) U.S. Cl.
CPC ......... *H04N 5/23212* (2013.01); *G02B 7/285* (2013.01); *G03B 13/36* (2013.01); *G03B 19/12* (2013.01)

(58) Field of Classification Search
CPC .. H04N 5/23212; H04N 5/3696; G03B 13/32; G03B 13/34; G03B 13/36;
(Continued)

(56) References Cited

U.S. PATENT DOCUMENTS 7,920,782 B2   4/2011   Fujii
8,203,642 B2   6/2012   Sogawa et al.
(Continued)

FOREIGN PATENT DOCUMENTS

EP   1 085 751 B1   3/2001
JP   2001-083407 A   3/2001
(Continued)

OTHER PUBLICATIONS

Search Report dated Dec. 4, 2015, in European Patent Application No. 15170999.5.
(Continued)

*Primary Examiner* — Nelson D. Hernández Hernández
(74) *Attorney, Agent, or Firm* — Fitzpatrick, Cella, Harper & Scinto (57) ABSTRACT

An image pickup apparatus comprising an imaging element for capturing an object image, and a sensor dedicated to focus detection for receiving light reflected from the object to output a signal for focus detection is provided. The image pickup apparatus carries out continuous shooting that sequentially exposes an imaging element. The image pickup apparatus acquires mode related information used in the determination of a focus adjusting mode applied to an interval between each of the exposures during the continuous shooting, and based on the acquired mode related information, determines either a first focus adjusting mode for calculating a defocus amount based on a signal output by the imaging element or a second focus adjusting mode for calculating the defocus amount based on a signal for focus detection output by the sensor dedicated for focus detecting, to be the focus adjusting mode applied to the interval between each of the exposures.

12 Claims, 4 Drawing Sheets

(51) Int. Cl.
*G03B 19/12* (2006.01)
*G03B 13/36* (2006.01)

(58) Field of Classification Search
CPC .......... G02B 7/285; G02B 7/34; G02B 7/343;
G02B 7/346; G02B 7/36; G02B 7/365;
G02B 7/38; G01C 3/00; G06T 5/003
USPC .................. 348/345, 356, 354, 355, 349
See application file for complete search history.

(56) References Cited

U.S. PATENT DOCUMENTS

| 2006/0061676 A1* | 3/2006 | Suda ................ G02B 7/285 |
| | | 348/345 |
| 2008/0118238 A1 | 5/2008 | Sogawa et al. |
| 2009/0034955 A1 | 2/2009 | Kunishige et al. |
| 2009/0110383 A1 | 4/2009 | Fujii |
| 2009/0185069 A1 | 7/2009 | Aoyama |
| 2011/0001858 A1 | 1/2011 | Shintani et al. |

FOREIGN PATENT DOCUMENTS

| JP | 2008-129174 A | 6/2008 |
| JP | 2009-109631 A | 5/2009 |
| JP | 2010-204294 A | 9/2010 |
| WO | 2009/113644 A | 9/2009 |

OTHER PUBLICATIONS

Office Action in Russian Patent Application No. 2015123117, dated Aug. 11, 2016.

* cited by examiner

IMAGE PICKUP APPARATUS AND CONTROL METHOD WITH FOCUS ADJUSTING MODES

BACKGROUND OF THE INVENTION

Field of the Invention

The present invention relates to an image pickup apparatus and a control method.

Description of the Related Art

There has been proposed for an image pickup apparatus such as a single-lens reflex camera and the like a plurality of focus adjusting modes. One of the focus adjusting modes allows light flux from an object passed through exit pupil regions different from each other in an imaging optical system to form an image on a pair of line sensors and calculates a defocus amount of the imaging optical system from the phase difference between a pair of image signals obtained by the pair of line sensors to adjust its focus. At this time, the line sensor for detecting the image signal is a provided sensor dedicated to focus detection (sensor dedicated for focus detecting).

Also, there is another focus adjusting mode that uses an imaging element. In this type of the focus adjusting mode, an imaging (capturing) is performed by pupil-dividing imaging pixels in the imaging element with a microlens and receiving an optical axis with a plurality of focus detecting pixels, while driving the lens by calculating the defocus amount based on the pair of image signals output by the imaging.

Japanese Patent Laid-Open No. 2001-083407 discloses an image pickup apparatus having an imaging element in which a microlens for dividing an object image into a pair of images is provided in two photoelectric conversion units. Also, Japanese Patent Laid-Open No. 2009-109631 discloses an image pickup apparatus for calculating the defocus amount based on phase difference between the pair of image signals obtained in continuous shooting. Also, Japanese Patent Laid-Open No. 2008-129174 proposes an image pickup apparatus for suitably using each focus adjusting mode included in the plurality of focus adjusting modes.

In continuous shooting with automatic focus adjustment (AF), either continuous shooting consisting of the focus adjusting mode with the sensor dedicated to focus detecting or that consisting of the focus adjusting mode with the imaging element has been performed, because a continuous shooting speed is reduced by operating both the sensor dedicated to focus detection and the imaging element at all times in the continuous shooting.

In the continuous shooting using the focus adjusting mode with the sensor dedicated to focus detection, the sensor accumulates an image signal during exposure, in other words, the time from a photographing of an image to the photographing of the next image, and the defocus amount is calculated to drive the lens. This continuous shooting requires time to accumulate the image signal in the sensor, and the accumulation time is determined depending on brightness. For example, the time is short when it is bright, and the time is long when it is dark. Generally, while having the same brightness, the more capable an imaging element is of directly receiving the light adding the pixels, the shorter an accumulation time.

Also, when temperature is significantly outside of normal temperature, it is difficult to perform corrections to maintain the distance relationship between the sensor and the imaging element because the temperature causes changes of the optical path length from the photographing lens to the sensor dedicated to focus detection or the length of a flange back of the imaging element. Thus, in this case, the focus adjusting mode with the sensor dedicated to focus detection often performs the focus detecting with larger error compared to that with the imaging element.

In contrast, in the continuous shooting by the focus adjusting mode using the imaging element, the defocus amount is calculated by using the exposure to photograph a photographing image to drive the lens as disclosed in Japanese Patent Laid-Open No. 2009-109631. In the continuous shooting by the focus adjusting mode using the imaging element, occasionally, the image processing of the photographing image or the like is performed in parallel with the processing for calculating the defocus. In other words, both processing are performed by one CPU, and it may take a long time to calculate the defocus amount. Also, since this mode uses the imaging element, a reading direction is fixed. For example, the precision for the focus detection is reduced when the reading direction is horizontal because the pair of image signals is acquired in a horizontal direction. In contrast, the sensor dedicated to focus detecting can be arranged to detect both a vertical line and a horizontal line because it has a degree of freedom with respect to the arrangement in the directions of the line sensors.

Also, in the focus adjusting mode with the imaging element, distortion of the image is caused more easily compared to the focus adjusting mode with the sensor, and cannot detect the focus when the defocus amount is large. Thus, the continuous shooting speed may be reduced occasionally in each of focus adjusting modes. Also, there is a condition that the focus adjusting modes cannot be applied together, and the continuous shooting speed is reduced by using both of the focus adjusting modes under this condition.

SUMMARY OF THE INVENTION

The present invention provides an image pickup apparatus with a plurality of focus adjusting modes, capable of maintaining precision for focus detection and preventing a reduction of continuous shooting speed depending on a condition at continuous shooting.

An image pickup apparatus of an embodiment of the present invention comprises: an imaging element configured to capture an object image by exposure of object light; a sensor unit configured to receive the object light and output a signal for focus detection; a shooting unit configured to sequentially expose the imaging element and carry out continuous shooting; and a controlling unit configured to acquire mode-related information used in determination of a focus adjusting mode applied to an interval between each of the exposures by the continuous shooting, and determine either a first focus adjusting mode for calculating a defocus amount based on a signal output by the imaging element or a second focus adjusting mode for calculating the defocus amount based on the signal for the focus detection output by the sensor unit to be the focus adjusting mode that is applied to the interval between each of the exposures based on the acquired mode-related information.

Further features of the present invention will become apparent from the following description of exemplary embodiments (with reference to the attached drawings).

DESCRIPTION OF THE EMBODIMENTS

Figure 1:
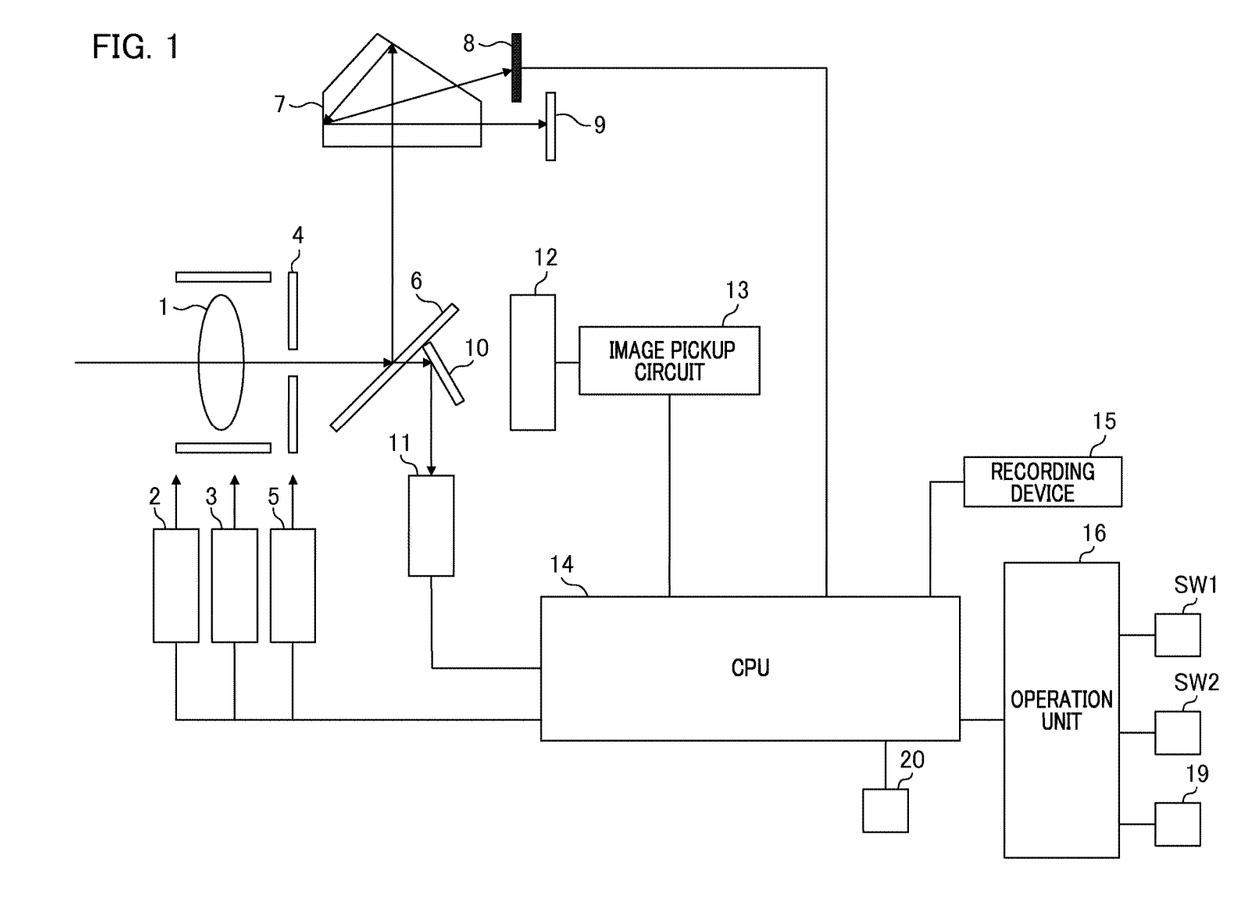
FIG. 1 illustrates an exemplary configuration of an image pickup apparatus according to the present embodiment.

FIG. 1 illustrates an exemplary configuration of an image pickup apparatus according to the present embodiment.

The size and shape of each component, and relative arrangement therefor and the like exemplified in the present embodiment should be suitably altered depending on a configuration or each type of conditions of an apparatus to be applied to the present invention, and these illustrations are not intended to limit the present invention.

In FIG. 1, a photographing lens 1 is an optical member that directs object light (light reflected from an object) in a direction of an imaging element 12. An AF drive unit 2 drives the photographing lens 1 to perform automatic focus adjustment (AF) control. The AF drive unit 2 is configured, for example, by a DC motor or a stepping motor, and focuses on a desired area in the photographing image by altering the focus lens position of the photographing lens 1 with control of the CPU 14.

A zoom drive unit 3 drives the photographing lens 1 to alter the focal length of the photographing lens 1. The zoom drive unit 3 is configured, for example, by the DC motor or the stepping motor, and the variable magnification lens position of the photographing lens 1 is altered by the control of the CPU 14 to alter the focal length of the photographing lens 1.

An aperture 4 adjusts the light amount incident to the imaging element 12. An aperture drive unit 5 drives the aperture 4. The aperture drive unit 5 drives the aperture 4 based on an aperture drive amount calculated by the CPU 14 to alter an aperture value.

A main mirror 6 and a sub mirror 10 constitute a mirror member. The mirror member is arranged so as to be retractable from an optical path through which the light reflected from the object is directed to the imaging element 12. The main mirror 6 switches light flux incident from the photographing lens 1 into a side of a viewfinder or a side of the imaging element. In a normal phase, the main mirror 6 is arranged so as to reflect the light and direct the light flux to a viewfinder unit. When the photographing is performed, the main mirror 6 jumps up (mirrors up) to direct the light flux to the imaging element 12 and retracts from the light flux. The sub mirror 10 switches the light flux incident from the photographing lens 1 into the side of the sensor dedicated to focus detecting or the side of the imaging element. The sub mirror 10 is arranged so as to reflect the light and direct the light flux to the sensor dedicated to focus detecting in the normal phase. When the photographing is performed, the sub mirror 10 jumps up (mirrors up) in accordance with the main mirror 6 so as to direct the light flux to the imaging element 12, and retract from the optical path.

A viewfinder 9 and a pentaprism 7 constitute a viewfinder unit. The light flux incident to the viewfinder unit enters to the pentaprism 7. The light incident to the pentaprism 7 repeats reflection inside thereof and is entered to the viewfinder 9 together with a photometric sensor 8. The viewfinder 9 displays a current exposure value and the like together with the incident light that has entered from the photographing lens 1.

The photometric sensor 8 measures the brightness of the object by the light flux incident from the photographing lens 1 and reads the result as photometric data. The photometric data is sent to the CPU 14.

A sensor dedicated to focus detection 11 is a sensor unit for receiving the light reflected from the object to output a signal for the focus detecting. The sensor dedicated to focus detection 11 has a pair of line sensors and allows the light flux from the object that has passed through exit pupil regions different from each other to form an image on the pair of line sensors. The CPU 14 calculates the phase difference between a pair of image signals that forms the image to obtain the defocus amount (carries out the focus detection).

The imaging element 12 forms an object image passed through the photographing lens 1 to be photoelectrically converted. In other words, the imaging element 12 images the object image by the exposure of the light reflected from the object. An image pickup circuit 13 outputs an electrical signal obtained by the imaging element 12 as image data.

Also, the imaging element 12 holds two photodiodes in one pixel in order to perform the phase difference focus detection in an imaging plane. The light flux is separated by the microlens, and the image is formed by the two photodiodes, and allows the two signals for the imaging and for the focus detecting to be picked up. The signal for the focus detecting is sent through the image pickup circuit 13 to the CPU 14. The CPU 14 performs correlation operation on the two image signals and calculates the defocus amount.

The CPU 14 controls the whole image pickup apparatus. More specifically, the CPU 14 performs operation of an exposure amount for the aperture and the shutter speed and the like by using the photometric data for the brightness of the object received from the photometric sensor 8. Additionally, the CPU 14 functions as a photographing unit configured to sequentially expose the imaging element 12 and carry out the continuous shooting.

Also, the CPU 14 determines whether either a first focus adjusting mode with the imaging element 12 or a second focus adjusting mode with the sensor dedicated to focus detection 11 is used as an AF mode at continuous frames, in other words, intervals between each of the exposures in the continuous photographing. The first focus adjusting mode is the AF mode for calculating the defocus amount based on the signal output by the imaging element 12. The second focus adjusting mode is the AF mode for calculating the defocus amount based on the signal for focus detection output by the sensor dedicated to focus detection 11. The CPU 14 acquires mode-related information which is information used in the determination of the AF mode applied to the interval between each of the exposures, and depending on the acquired mode-related information, determines which AF mode is used. The mode-related information comprises, for example, designation information that designates a determination method for the focus adjusting mode applied to the interval between each of the exposures. Also, the mode-related information comprises, for example, information that defines the continuous shooting speed during the continuous shooting. Also, the mode-related information comprises, for example, information that defines the precision of the focus detection during the continuous shooting.

Also, the CPU 14 determines the start of a release based on the output from an operation unit 16 to perform mechanical control or an operation for the photographing, and records the photographed image to a recording device 15 together with a variety of photographing data. Also, the CPU 14 stores a setting value.

The operation unit 16 inputs operating information according to the operation of a photographer. The CPU 14 controls each processing unit depending on the input operating information. For example, the photographer determines a setting for the photographing by using an operation member 19. For example, the setting of the photographing comprises a setting of specific processing such as a fish eye type-processing and a toy camera type-processing by which the image will be processed, and a setting indicating whether or not a noise at high sensitivity is reduced by processing the image. The setting also comprises a selection of the AF mode. The setting of the photographing is recorded in the CPU 14.

A switch SW1 and a switch SW2 are switched ON/OFF by the operation of a release button, and are each one of input switches for the operation unit 16. The release button is in a half-pressed state when only the switch SW1 is turned ON, and the CPU 14 adjusts the focus, performs the photometric operation and the like at this state. The release button is in a full-pressed state when both of the switches SW1 and SW2 are turned ON. The photographing is performed at this state. A thermometer 20 measures the temperature inside of the camera. In the following, each embodiment is described by using the image pickup apparatus with the above configuration.

(First Embodiment)

Firstly, a description will be given of a setting for photographing by a photographer prior to the photographing. The photographer can set a variety of photographing methods by using the operation member 19. These methods comprise a setting that performs image processing on the photographed image. For example, this setting sets whether or not the specific processing, such as fish-eye or a toy camera, is performed on the image, or whether or not the noise at high sensitivity is reduced by the processing of the image. If any of these settings is performed, the load on the CPU 14 increases because the image processing is performed on the data after the exposure is read out. If the load of the CPU increases, other processing can be deferred or delayed.

Also, the photographer can set the AF modes during the photographing. One of the modes is designation of a frame AF mode. The frame AF mode is a mode for adjusting the focus at the interval between each of the exposures (AF mode). If the designation of the frame AF mode by the photographer is accepted, the CPU 14 acquires the mode-related information comprising the designation information for designating the determination method for the focus adjusting mode applied to the interval between each of the exposures. The CPU 14 determines the frame AF mode according to the designation represented by the designation information.

In the designation represented by the designation information, there are three types of the designation in the present embodiment: a designation for instructing the determination of the AF mode using the focus detection by the sensor dedicated to focus detection as the frame AF mode; the designation for instructing the determination of the AF mode using the focus detection by the imaging element as the frame AF mode; and the designation for instructing to properly use both of the modes.

The designation for instructing proper use of both modes is the designation that allows the AF mode with the better performance among the AF mode using the focus detection by the sensor dedicated to focus detection and that using the focus detection by the imaging element to be determined as the frame AF mode.

For example, the AF mode with the better performance means that the mode has the continuous shooting speed faster than another one when the mode is applied. If the designation information represents the designation for instructing the proper use of both of the modes, the CPU 14 acquires information that defines the continuous shooting speed during the continuous shooting as the mode-related information, for example, for respective AF modes. Additionally, the CPU 14 determines the AF mode having a continuous shooting speed that is faster than another one as the frame AF mode. The continuous shooting speed is judged based on the information that defines the continuous shooting speed during the continuous shooting.

Also, the AF mode with the better performance means the AF mode with the higher precision for the focus detection. The CPU 14 acquires information that defines the precision for the focus detection during the continuous shooting as the mode-related information, for example, for the respective AF modes. Then, the CPU 14 determines the AF mode with the higher precision for the focus detection based on the information that defines the precision for the focus detection during the continuous shooting as the frame AF mode. The mode-related information is recorded in the CPU 14. Also, the photographer can set a silent sound photographing mode for a quiet driving sound by slowing mirror-drive.

Figure 2:
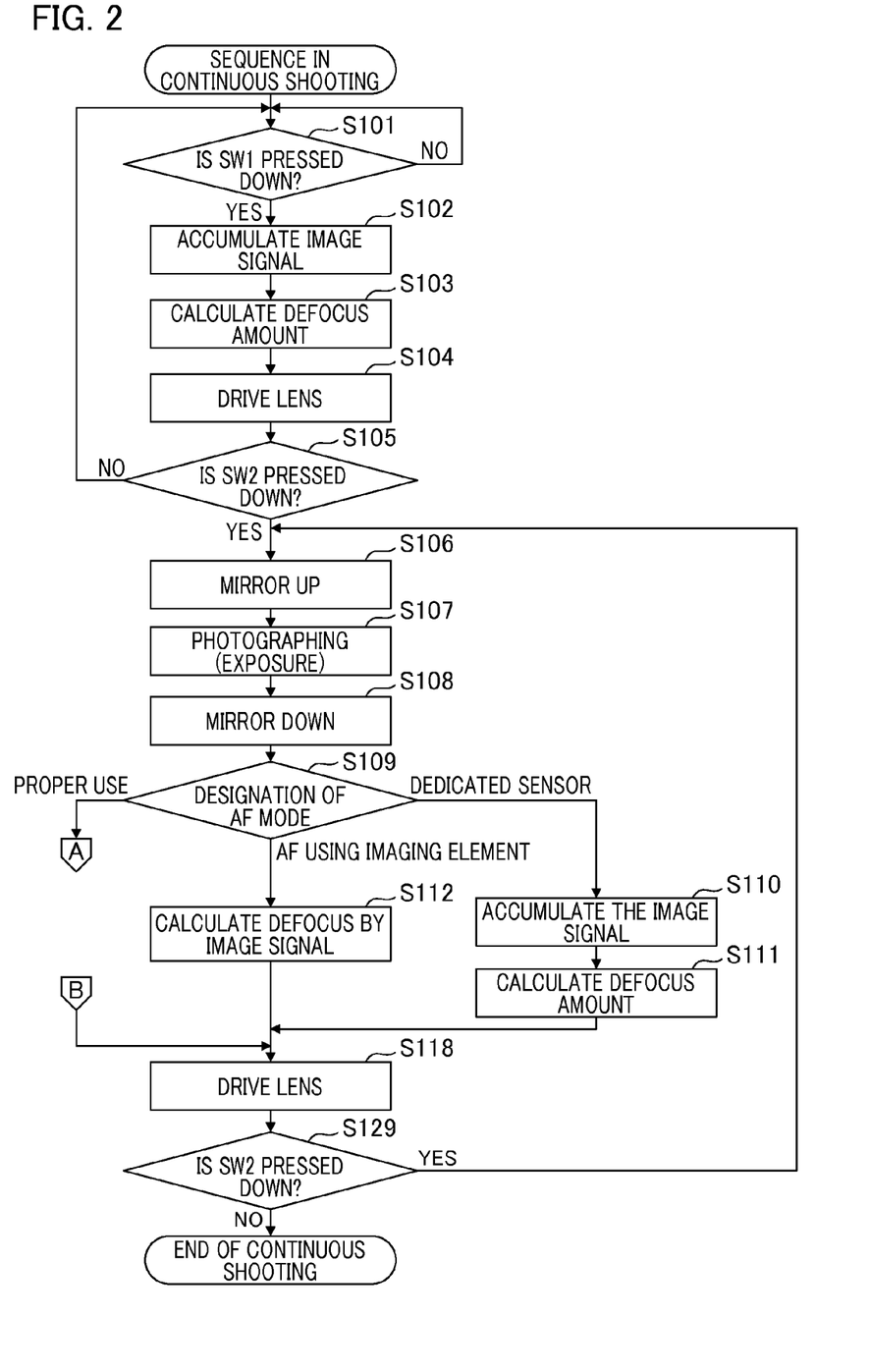
FIG. 2 is a flowchart illustrating an exemplary processing for operation during continuous shooting by the image pickup apparatus.
Figure 3:
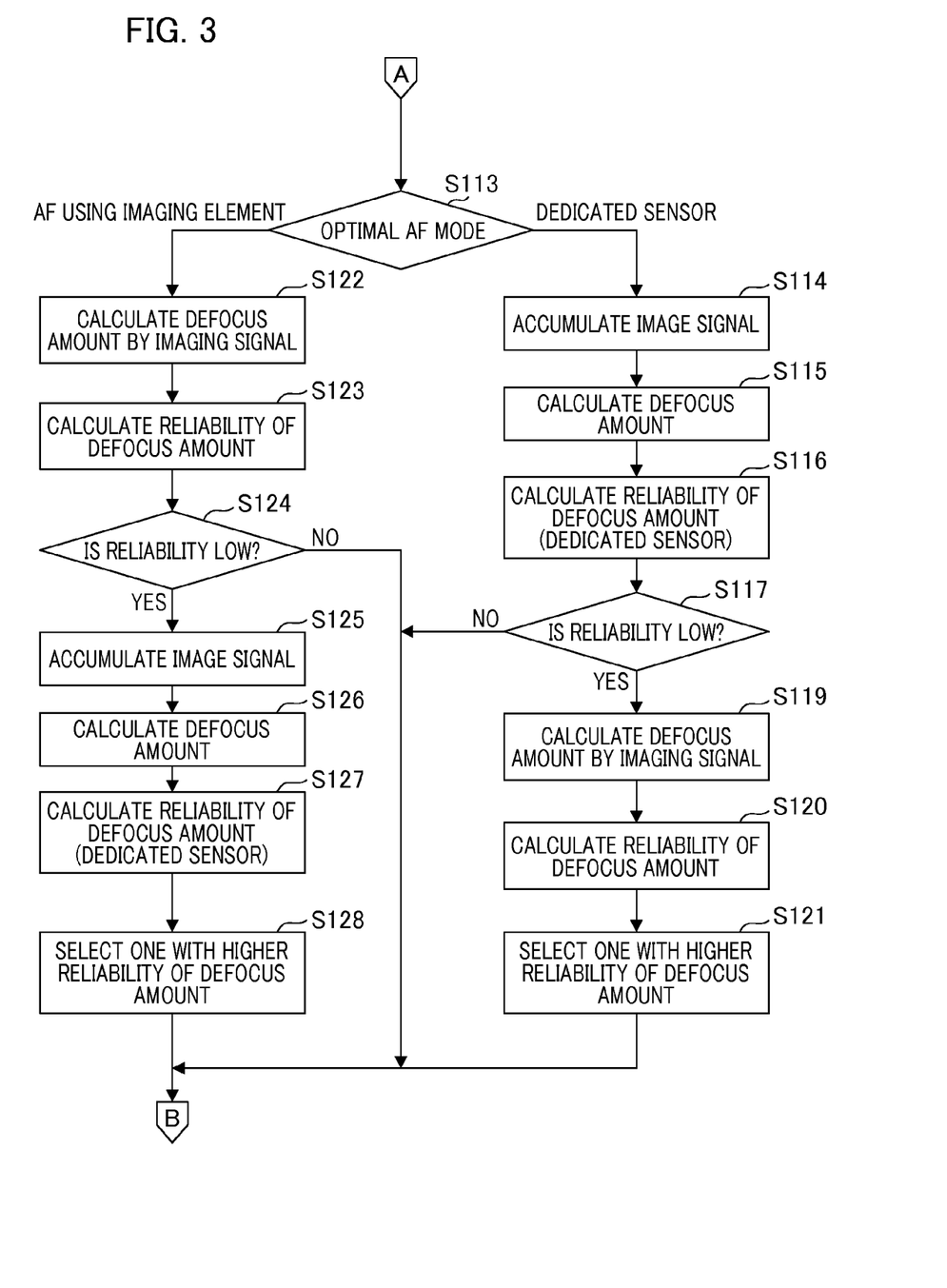
FIG. 3 is a flowchart illustrating an exemplary processing for operation during the continuous shooting by the image pickup apparatus.

FIG. 2 and FIG. 3 are flowcharts illustrating exemplary processing for operation during the continuous shooting by the image pickup apparatus.

Firstly, in S101 of FIG. 2, the CPU 14 determines whether or not the SW1 is pressed down. If the SW1 is not pressed down, the processing is returned to S101. If the SW1 is pressed down, the processing proceeds to S102. Since it is in a mirror-down state while maintaining the SW1, the focus adjusting processing with the sensor dedicated to focus detection 11 is carried out as follows. Firstly, the CPU 14 accumulates the image signal in the sensor dedicated to focus detection 11 so as to acquire the image signal with the sensor dedicated to focus detection 11 (S102). The accumulation time for the image signal by the sensor dedicated to focus detection 11 is altered depending on the brightness. The CPU 14 stores this accumulation time.

Next, the CPU 14 calculates the defocus amount based on the phase difference between a pair of the image signals obtained by the accumulation (S103). Then, the CPU 14 allows the photographing lens 1 to be driven by using the defocus amount calculated in S103.

Next, the CPU 14 determines whether or not the SW2 is pressed down (S105). If the SW2 is not pressed down, the processing is returned to S101. If the SW2 is pressed down, the processing proceeds to S106, and the operation for the continuous shooting is started.

Firstly, the mirror is moved upward (S106). Then, the CPU 14 carries out the photographing processing by the exposure. The electrical signal, which has been photoelectrically converted by the imaging element 12, is sent through the image pickup circuit 13 to the CPU 14 as the image data (S107). Also, since a pair of signals for the focus detection is output from the imaging element 12 by the exposure to the imaging element 12, the pair of signals for the focus detecting is also sent through the image pickup circuit 13 to the CPU 14.

Next, the CPU 14 allows the mirror to be down so that the image can be seen by the viewfinder 9 (S108).

Then, the CPU 14 acquires the mode-related information, and confirms the content of the designation of the AF mode represented by the designation information included in the mode-related information.

If the designation information represents the designation that designates the AF mode using the focus detection by the sensor dedicated to focus detection to be determined as the frame AF mode, the processing proceeds to S110. The image signal is accumulated in the sensor dedicated to focus detecting 11 (S110). The CPU 14 calculates the defocus amount based on the phase difference between the pair of image signals output from the sensor dedicated to focus detection 11 (S111). Then, the CPU 14 drives the photographing lens 1 by using the defocus amount calculated in S111 (S118). Then, the CPU 14 determines whether or not the SW2 is pressed down (S129). If the SW2 is pressed down, the processing proceeds to S106. If the SW2 is not pressed down, the continuous shooting is stopped.

If the designation information represents the designation for designating the determination of the AF mode using the focus detection by the imaging element as the frame AF mode, the processing proceeds to S112. Then, the CPU 14 performs the correlation operation on the pair of signals for the focus detection obtained in S107, and calculates the defocus amount (S112).

If the designation information represents the designation for designating both of the modes to be used properly, the processing proceeds to S113 in FIG. 3. Then, the CPU 14 determines that either the AF mode using the focus detection by the imaging element or the AF mode using the focus detection by the sensor dedicated to focus detecting is the optimal AF mode, and selects the AF mode determined to be optimal (S113). More specifically, the CPU 14 determines the AF mode with the better performance to be the optimal AF mode. The selection of the optimal AF mode in S113 is described as below.

If the AF mode using the focus detection by the sensor dedicated to focus detection is selected as the optimal AF mode, the processing proceeds to S114. Then, the CPU 14 accumulates the image signal by the sensor dedicated to focus detection 11 as the above S102 (S114). Then, the CPU 14 calculates the defocus amount based on the phase difference between the pair of image signals obtained by the accumulation (S115).

Next, the CPU 14 calculates an evaluation value representing the reliability of the defocus amount (S116). The evaluation value representing the reliability of the defocus amount shows how accurate the defocus amount is. The evaluation value calculated in S116 corresponds to the AF mode using the focus detection by the sensor dedicated to focus detection. The CPU 14 calculates the evaluation value representing the reliability by using a degree of coincidence between the pair of the image signals. The reliability can be reduced if the brightness is low, the contrast of the object is low, or the like.

The CPU 14 determines whether or not the evaluation value representing the reliability is smaller than a threshold (S117). If the evaluation value representing the reliability is not smaller than the threshold, the photographing lens 1 is driven by using the defocus amount calculated in the above S115.

If the evaluation value representing the reliability is smaller than the threshold, the CPU 14 performs the correlation operation on the pair of the signals for the focus detecting output from the imaging element 12 in S107 as described above, and calculates the defocus amount (S119). Also, the CPU 14 calculates the evaluation value representing the reliability of the defocus amount by using the degree of coincidence between the pair of signals for the focus detecting output from the imaging element 12 (S120). The evaluation value calculated in S120 corresponds to the AF mode using the focus detection by the imaging element. The CPU 14 selects the AF mode that corresponds to the higher evaluation value from either the evaluation value representing the reliability calculated in S116 (a first evaluation value) or the evaluation value representing the reliability calculated in S120 (a second evaluation value) (S121). Then, the CPU 14 drives the photographing lens 1 by using the defocus amount corresponding to the AF mode which is selected in S121 described above.

In S113 described above, if the AF mode using the focus detection by the imaging element is selected as the optimal AF mode, the processing proceeds to S122. Then, the CPU 14 performs the correlation operation on the pair of signals for the focus detecting output from the imaging element 12 in S107 described above, and calculates the defocus amount (S122). Also, the CPU 14 calculates the evaluation value representing the reliability of the defocus amount by using the degree of coincidence between the pair of signals for the focus detecting output from the imaging element 12 (S123). The evaluation value calculated in S123 corresponds to the AF mode using the focus detection by the imaging element.

Next, the CPU 14 determines whether or not the calculated evaluation value representing the reliability is smaller than a threshold (S117). If the evaluation value representing the reliability is not smaller than the threshold, the photographing lens 1 is driven by using the defocus amount calculated in S115 as described above.

If the evaluation value representing the reliability is smaller than the threshold, the CPU 14 accumulates the image signals by the sensor dedicated to focus detecting 11 (S125). Then, the CPU 14 calculates the defocus amount based on the phase difference of the pair of image signals obtained by the accumulation (S126).

Next, the CPU 14 calculates the evaluation value representing the reliability of the defocus amount calculated in S126 (S127). The evaluation value calculated in S127 corresponds to the AF mode using the focus detection by the sensor dedicated to focus detection. The CPU 14 selects the AF mode corresponding to the higher evaluation value from either the evaluation value representing the reliability calculated in S123 or the evaluation value representing the reliability calculated in S127 (S128). Then, the processing proceeds to S118 in FIG. 2, and the CPU 14 drives the photographing lens 1 by using the defocus amount corresponding to the AF mode selected in S128 as described above (S118).

A description will be given of a method for selecting the optimal AF mode in S113 of FIG. 3. As methods for selecting the optimal AF mode, there are proposed methods from a first selecting method to a third selecting method as described below.

The first selecting method is a method for selecting the AF mode having a continuous shooting speed that becomes faster. The CPU 14 acquires (calculates) information that defines the continuous shooting speed during the continuous shooting for the AF mode using the focus detection by imaging element and that using the focus detection by the sensor dedicated to focus detection respectively. The information that defines the continuous shooting speed during the continuous shooting is the time until the defocus amount is calculated.

The time until the defocus amount is calculated by the AF mode using the focus detection by the sensor dedicated to focus detection is total of the mirror-up time, accumulation time for the image signal in the sensor dedicated to focus detection, and defocus calculation operation time. The mirror up time is the time to retract the mirror member from the optical path. The mirror up time is altered depending on whether or not the photographing mode is the normal photographing mode or the silent sound photographing mode. The CPU 14 stores in advance the corresponding information between the mirror up time and the photographing mode, and determines the mirror up time corresponding to the photographing mode during the photographing by using this corresponding information. The CPU 14 uses the last accumulation time in S102 while maintaining the SW1 as the accumulation time of the sensor dedicated to focus detection. The accumulation time is altered depending on the brightness. If it is bright, the accumulation time becomes short, and if it is dark, the accumulation time becomes long. Note that the defocus calculation operation time is not altered depending on the setting.

The time until the defocus amount is calculated by the AF mode using the focus detection by the imaging element is total of time for the image processing (image processing time) and the defocus calculation operation time. Because in the AF mode using the focus detection by the imaging element, the imaging processing and the defocus calculation operation can be performed during the mirror up, the mirror up time is not added in the total time. The image processing time is determined depending on the image processing during the photographing. The CPU 14 stores in advance the corresponding information between the image processing and expected time for the image processing, and determines the total of the expected time corresponding to each image processing determined before the photographing as the image processing time. For example, the image processing time is 20 ms if image-processing such as a fish eye is applied to the image, the image processing time is 10 ms if monochromatic image processing is applied to the image, and the image processing time is 5 ms if the processing for the noise at the high sensitivity is applied to the image. Note that the defocus calculation operation time if the imaging element is used is not also altered depending on the setting. The CPU 14 selects the AF mode in which the time until the defocus amount is calculated as described above is shorter by determining the AF mode as the AF mode having a continuous shooting speed that becomes faster.

The second selecting method is a method for selecting the AF mode with the higher precision for the focus detection. With respect to the precision for the focus detection, either the AF mode using the focus detection by the sensor dedicated to focus detection or the AF mode using the focus detection by the imaging element is determined to be the better AF mode depending on the photographing condition. Thus, the CPU 14 selects the AF mode whose precision for the focus detection is not degraded (with the higher precision for the focus detection) according to the information representing the photographing condition.

Information representing the photographing condition comprises for example, a reading direction of the imaging element and information about whether the object is a vertical line or a horizontal line. If the reading direction of the imaging element is the horizontal direction, and the object is the horizontal line, the pair of image signals is acquired with respect to the horizontal. Thus, in this case, the precision for the focus detection in the AF mode using the focus detection by the imaging element is worse than that using the focus detection by the sensor dedicated to focus detection. Also, if the reading direction of the imaging element is the vertical direction and the object is the vertical line, the pair of the image signals is acquired with respect to the vertical. Thus, in this case, the precision for the focus detection in the AF mode using the focus detection by the imaging element is worse than that using the focus detection by the sensor dedicated to focus detection. The precision of the focus detection by sensor dedicated to focus detection is not reduced even if the object is the horizontal line or is the vertical line, since the sensor dedicated to focus detection detects the focus by detecting the horizontal line and the vertical line with the arrangement of the line sensors.

More specifically, if the reading direction of the imaging element 12 is the horizontal direction, and the sensor dedicated to focus detection 11 detects the horizontal line in the AF while maintaining the SW1 (S102 to S104 in FIG. 2), the CPU 14 selects the AF mode using the focus detection by the sensor dedicated to focus detection. Also, if the reading direction of the imaging element 12 is the vertical direction, and the sensor dedicated to focus detection 11 detects the horizontal line, the CPU 14 selects the AF mode using the focus detection by the sensor dedicated to focus detection.

Also, the information representing the photographing condition comprises for example, the distance from the image pick up apparatus to the object (object distance). In the AF mode using the focus detection by the imaging element, the defocus amount becomes large and it is easy to cause a distortion of the image if the object distance is large. In other words, the precision for the focus detection is degraded in this case. Thus, for example, the CPU 14 selects the AF mode using the focus detection by the sensor dedicated to focus detection, if the object distance obtained from a measuring unit configured to measure the object distance (not shown) is larger than a predetermined magnitude of the distance. Note that the CPU 14 may select the AF mode using the focus detection by the sensor dedicated to focus detection, if the photographing is performed while the large defocus amount is still calculated in AF while maintaining the SW1 (from S102 to S104 in FIG. 2).

Also, the information representing the photographing condition comprises for example, the temperature of the image pickup apparatus. When the temperature is significantly outside of the normal temperature, the sensor dedicated to focus detection 11 cannot acquire the correct defocus amount for the imaging plane because the optical path length from the photographing lens to the sensor dedicated to focus detection 11 or the length of the flange back is altered, and this causes the deterioration of the distance relationship to the imaging plane. Thus, the CPU 14 measures the temperature by the thermometer 20 before the photographing, and selects the AF mode using the focus detection by the imaging element if the measured temperature is higher than a predetermined temperature.

The third selecting method is a method for selecting the AF mode by using the result of the focus detection during the continuous shooting. The reliability of the defocus amount by the selected AF mode may be low, and the focus adjustment may be performed by using the defocus amount for the other AF mode as described in S124 to S126 and 117 to S121 in FIG. 3. In this case, the CPU 14 selects the AF mode used in the above focus detection as the AF mode for the next interval between exposures.

Figure 4:
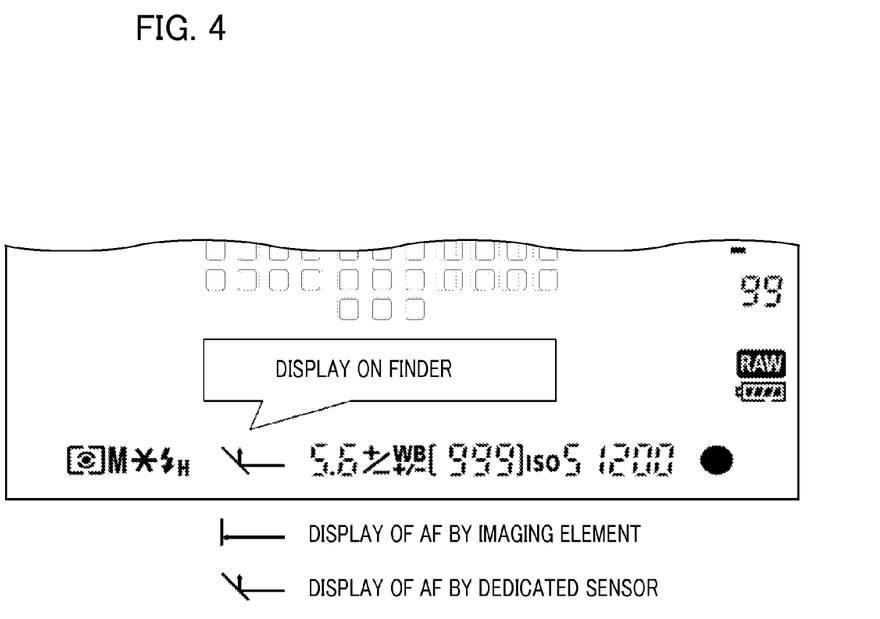
FIG. 4 illustrates an exemplary display by a viewfinder when an AF mode is switched.

FIG. 4 illustrates an exemplary display by the viewfinder when the AF mode is switched.

The CPU 14 displays information representing the AF mode used in the focus adjustment on the viewfinder 9 whenever the AF mode is switched. In the example illustrating in FIG. 4, an image representing the AF mode using the focus detection by the sensor dedicated to focus detection is displayed. Note that the information representing the AF mode used in the focus adjustment may be a text other than the image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-126983, filed Jun. 20, 2014, which is hereby incorporated by reference wherein in its entirety.

What is claimed is:

1. An image pickup apparatus comprising:
an imaging element configured to capture an object image by exposure of object light;
a sensor unit configured to receive the object light and output a signal for focus detection;
a shooting unit configured to sequentially expose the imaging element and carry out continuous shooting; and
a controlling unit configured to, at every interval between each of the exposures during the continuous shooting, acquire mode-related information used in determination of a focus adjusting mode to be applied to the respective interval between each of the exposures, and determine, based on the acquired mode-related information, either a first focus adjusting mode for calculating a defocus amount based on a signal output by the imaging element or a second focus adjusting mode for calculating the defocus amount based on the signal for focus detection output by the sensor unit to be the focus adjusting mode that is applied to the respective interval between each of the exposures.

2. The image pickup apparatus according to claim 1, wherein the controlling unit is configured to:

acquire information that defines continuous shooting speed during the continuous shooting for each of the first focus adjusting mode and the second focus adjusting mode as the mode-related information, and determine the focus adjusting mode with the faster continuous shooting speed determined based on the acquired information among the first focus adjusting mode and the second focus adjusting mode to be the focus adjusting mode applied to the respective interval between each of the exposures.

3. The image pickup apparatus according to claim 2, wherein the controlling unit is configured to:

if a first evaluation value representing reliability of the defocus amount in the focus adjusting mode with the faster continuous shooting speed among the first focus adjusting mode and the second focus adjusting mode is not lower than a threshold, further determine the focus adjusting mode with the faster continuous shooting speed to be the focus adjusting mode applied to the respective interval between each of the exposures, and if the first evaluation value is lower than the threshold, calculate a second evaluation value representing the reliability of the defocus amount in the focus adjusting mode with the slower continuous shooting speed among the first focus adjusting mode and the second focus adjusting mode, and further determine the focus adjusting mode corresponding to the higher evaluation value among the first evaluation value and the second evaluation value to be the focus adjusting mode applied to the respective interval between each of the exposures.

4. The image pickup apparatus according to claim 3, wherein the controlling unit is configured to, if the focus adjusting mode applied to the respective interval between each of the exposures is determined as the focus adjusting mode corresponding to the higher evaluation value among the first evaluation value and the second evaluation value, carry out focus adjustment by using the defocus amount calculated by the focus adjusting mode corresponding to the higher evaluation value among the first evaluation value and the second evaluation value.

5. The image pickup apparatus according to claim 2, wherein the controlling unit is configured to:

acquire, at every interval between each of the exposures during the continuous shooting, designation information for designating a determination method for the focus adjusting mode applied to the respective interval between each of the exposures as the mode-related information, determine, at every interval between each of the exposures during the continuous shooting and if the designation information designates that the first focus adjusting mode is to be applied to the respective interval between each of the exposures, the first focus adjusting mode to be the focus adjusting mode applied to the respective interval between each of the exposures, determine, at every interval between each of the exposures during the continuous shooting and if the designation information designates that the second focus adjusting mode is to be applied to the respective interval between each of the exposures, the second focus adjusting mode to be the focus adjusting mode applied to the respective interval between each of the exposures, and further acquire, if the designation information designates that the focus adjusting mode with the higher performance among the first focus adjusting mode and the second focus adjusting mode is to be applied to the respective interval between each of the exposures, the information that defines the continuous shooting speed during the continuous shooting for each of the first focus adjusting mode and the second focus adjusting mode as the mode-related information.

6. The image pickup apparatus according to claim 2, wherein a mirror member is arranged so as to be retractable from an optical path through which the object light is directed to the imaging element,
wherein an exposure to the imaging element is performed while the mirror member is retracted from the optical path,
wherein, in the first focus adjusting mode, the information that defines the continuous shooting speed is time for the image processing to the object image output by the exposure to the imaging element and operation time of the defocus amount calculation, and
wherein, in the second focus adjusting mode, the information that defines the continuous shooting speed is time spent on the retracted operation from the optical path by the mirror member, the accumulation time of the image signal to the sensor unit, and the operation time of the defocus amount calculation.

7. The image pickup apparatus according to claim 1, wherein the controlling unit is configured to:
acquire information that defines precision for the focus detection during the continuous shooting for each of the first focus adjusting mode and the second focus adjusting mode as the mode-related information, and
determine the focus adjusting mode with the higher precision for the focus detection determined depending on the acquired information among the first focus adjusting mode and the second focus adjusting mode to be the focus adjusting mode applied to the respective interval between each of the exposures.

8. The image pickup apparatus according to claim 7, wherein the controlling unit is configured to:
if a first evaluation value representing reliability of the defocus amount in the focus adjusting mode with the higher precision for the focus detection among the first focus adjusting mode and the second focus adjusting mode is not lower than a threshold, further determine the focus adjusting mode with the higher precision for the focus detection to be the focus adjusting mode applied to the respective interval between each of the exposures, and
if the first evaluation value is lower than the threshold, calculate a second evaluation value representing the reliability of the defocus amount in the focus adjusting mode with the lower precision for the focus detection among the first focus adjusting mode and the second adjusting mode, and further determine the focus adjusting mode corresponding to the higher evaluation value among the first evaluation value and the second evaluation value to be the focus adjusting mode applied to the respective interval between each of the exposures.

9. The image pickup apparatus according to claim 8, wherein the controlling unit is configured to, if the focus adjusting mode applied to the respective interval between each of the exposures is determined as the focus adjusting mode corresponding to the higher evaluation value among the first evaluation value and the second evaluation value, carry out focus adjustment by using the defocus amount calculated by the focus adjusting mode corresponding to the higher evaluation value among the first evaluation value and the second evaluation value.

10. The image pickup apparatus according to claim 7, wherein the controlling unit is configured to:
acquire, at every interval between each of the exposures during the continuous shooting, designation information for designating a determination method for the focus adjusting mode applied to the respective interval between each of the exposures as the mode related information,
determine, at every interval between each of the exposures during the continuous shooting and if the designation information designates that the first focus adjusting mode is determined to be the focus adjusting mode applied to the respective interval between each of the exposures, the first focus adjusting mode to be the focus adjusting mode applied to the respective interval between each of the exposures,
determine, at every interval between each of the exposures during the continuous shooting and if the designation information designates that the second focus adjusting mode is to be applied to the respective interval between each of the exposures, the second focus adjusting mode to be the focus adjusting mode applied to the respective interval between each of the exposures, and
further acquire, if the designation information designates that the focus adjusting mode with the higher performance among the first focus adjusting mode and the second focus adjusting mode is to be applied to the respective interval between each of the exposures, the information that defines the continuous shooting speed during the continuous shooting for each of the first focus adjusting mode and the second focus adjusting mode as the mode-related information.

11. The image pickup apparatus according to claim 7, wherein the information that defines the precision for the focus detection during the continuous shooting comprises at least any one of a reading direction of the imaging element, information representing that the object is a vertical line or a horizontal line, distance from the image pick up apparatus to the object, and a temperature of the image pickup apparatus.

12. A control method of an image pickup apparatus comprising an imaging element configured to capture an object image by an exposure of object light and a sensor unit configured to receive the object light and output a signal for focus detection, the method comprising:
sequentially exposing the imaging element to carry out continuous shooting; and
at every interval between each of the exposures during the continuous shooting, acquiring mode-related information used in determination of a focus adjusting mode applied to the respective interval between each of the exposures, and determining, based on the acquired mode-related information, either a first focus adjusting mode for calculating a defocus amount based on a signal output by the imaging element or a second focus adjusting mode for calculating the defocus amount based on the signal for focus detection output by the sensor unit to be the focus adjusting mode that is applied to the respective interval between each of the exposures.

* * * * *